United States Patent [19]

Collin

[11] 4,271,940

[45] Jun. 9, 1981

[54] TWO-WAY POWER TRANSFERRING REDUCTION GEAR OF THE EPICYCLIC TYPE

[75] Inventor: Lars T. Collin, Mölndal, Sweden

[73] Assignee: Lars Collin Consult AB, Mölndal, Sweden

[21] Appl. No.: 39,665

[22] Filed: May 16, 1979

Related U.S. Application Data

[63] Continuation of Ser. No. 829,536, Aug. 31, 1977, abandoned, which is a continuation-in-part of Ser. No. 667,341, Mar. 16, 1976, Pat. No. 4,051,679, which is a continuation of Ser. No. 595,228, Jul. 11, 1975, abandoned, which is a continuation of Ser. No. 422,845, Dec. 7, 1973, abandoned.

[30] Foreign Application Priority Data

Dec. 8, 1972 [SE] Sweden .............................. 7216003

[51] Int. Cl.³ ..................... B63H 23/08; F16D 67/00
[52] U.S. Cl. ................................ 192/4 C; 192/0.094
[58] Field of Search ................... 192/4 C, 0.09, 0.094; 74/758, 764, 661

[56] References Cited

U.S. PATENT DOCUMENTS

| | | | |
|---|---|---|---|
| 2,648,998 | 8/1953 | Stoeckicht | 74/758 |
| 3,363,732 | 1/1968 | Nakamura et al. | 192/4 C |

*Primary Examiner*—Kenneth Downey
*Attorney, Agent, or Firm*—Holman & Stern

[57] ABSTRACT

A reversing/reduction gear connecting a marine gas turbine to a propulsion shaft is of the epicyclic type, and includes two sun wheels, two sets of planetary gear wheels, two planetary gear wheel carriers and two external ring wheels, means being provided for selectively braking a first combination of one planetary gear wheel carrier and one of the external gear wheels, as well as the combination of the other external ring wheel and one of the sun wheels, respectively.

1 Claim, 3 Drawing Figures

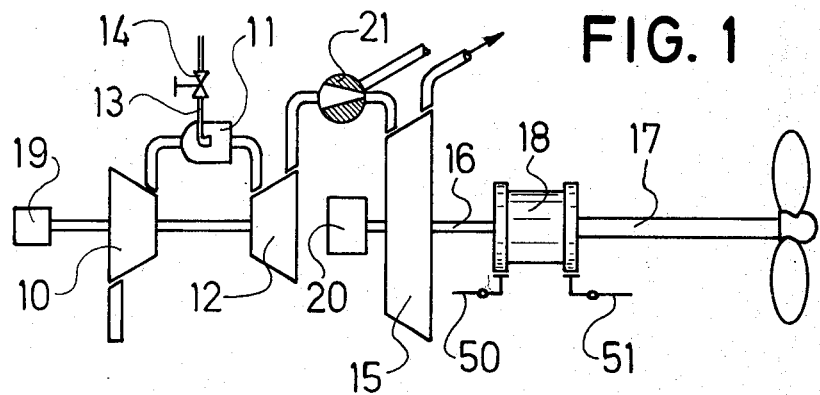
FIG. 1
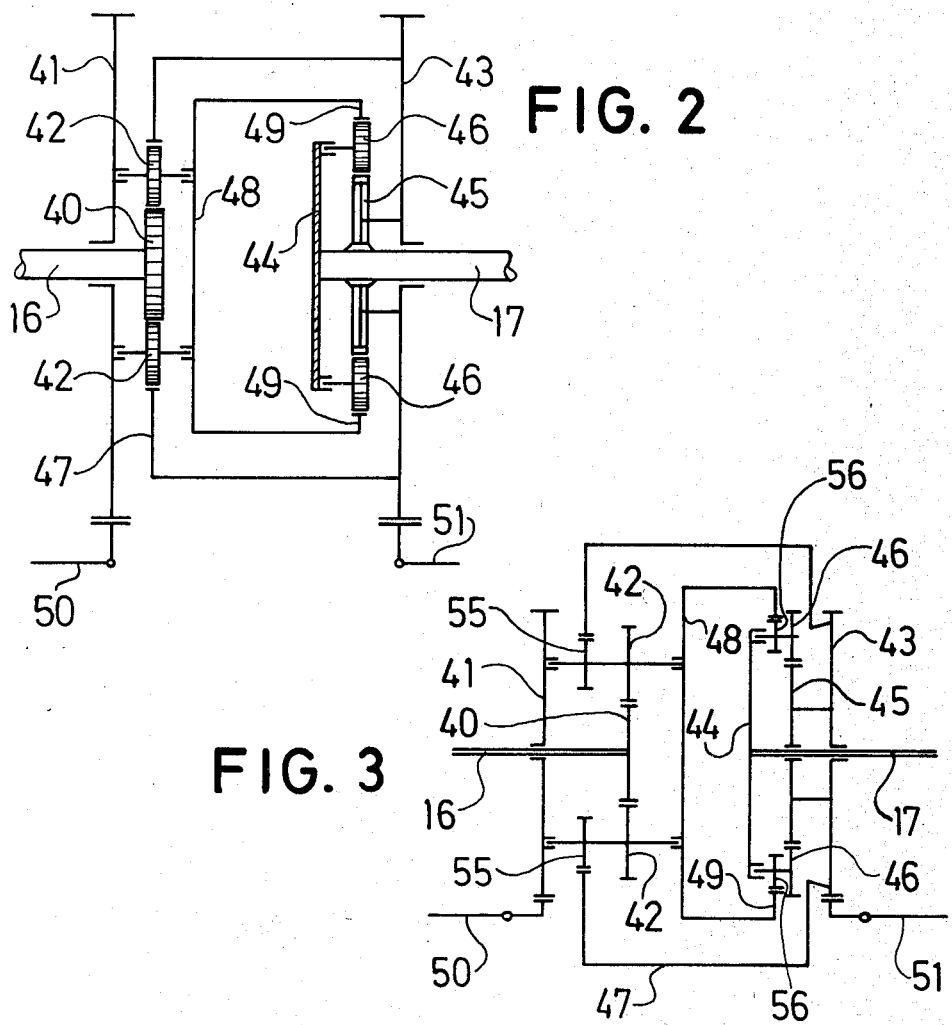
FIG. 2
FIG. 3

TWO-WAY POWER TRANSFERRING REDUCTION GEAR OF THE EPICYCLIC TYPE

REFERENCE TO RELATED ART

This is a continuation of application Ser. No. 829,536, filed Aug. 31, 1977, now abandoned which in turn is a continuation-in-part of U.S. Ser. No. 667,341, filed Mar. 16, 1976, which in turn is a continuation of U.S. Ser. No. 595,228, filed July 11, 1975, which in turn is a continuation of U.S. Ser. No. 422,845, filed Dec. 7, 1973.

BACKGROUND OF THE INVENTION

When designing high output marine propulsion machineries, the reversing has hitherto been a limiting factor. Certain engine types of prime movers are designed to be directly reversible so they can supply the required output in both directions of rotatation. Other machineries, as for instance turbines, do not possess such properties, while, with a third type, reversing is possible, constructional and operational complications make it more convenient to reverse by other means than the power unit itself.

Many gears with reversing facilities are very expensive, and have, for that reason, mainly been installed in warships. With steam turbines, the reversing problem has been solved by providing separate astern-turbines. Reversible gears have been proposed, in which the torque is transferred to different combinations of gears by means of hydraulic clutches being filled and emptied, and in turn connecting the machinery to the propeller via different gearways.

It has also been proposed, during a reversing operation, to reduce the torque acting upon the gear to about zero, by means of brakes mounted at the propeller shaft. As long as the ship is moving through the water, the propeller must also be braked which imposes a heavy load upon the brake.

SUMMARY OF THE INVENTION

The present invention relates to marine propulsion plants, in which the prime mover is a gas turbine, and which includes a reversing gear comprising a first part mechanically connected to the turbine and a second part connected to the propeller shaft, as well as means to maintain said parts in either of two different working conditions, for ahead and astern running, respectively. The plant is provided with means to govern the flow of motive fluid to the turbine, as well as means for braking the turbine and the part of the reversing gear connected thereto. The turbine rotor is carried in bearings permitting the rotation thereof in two different directions, and there are means at the reversing gear permitting transfer of torque the usual way from the turbine to the propeller shaft, but also in the opposite direction.

The parts of the reversing gear are designed in such a manner, that the turbine rotor and the gear part connected thereto will, in use, represent a considerably smaller inertia than the propeller shaft and the rotatable elements connected thereto, which means that it will be comparatively easy to brake the turbine after removing the supply of motive fluid thereto, and then to re-engage the gear parts. The turbine will then be forced to rotate "backwards" by the inertia of the propeller shaft, but the latter will first be braked and then brought to rotate in the new direction, when motive fluid is reapplied to the turbine.

The reversing/reduction gear is of the epicyclic type and includes the conventional components of sun wheel, planetary gear wheels, a carrier for the latter and an external ring wheels, two such sets of components being provided. The gear further includes first braking means for selectively determining the rotation of a first combination of one planetary gear wheel carrier and one external gear wheel, as well as second braking means for selectively determining the rotation of a combination of the other external ring wheel and one sun wheel.

BRIEF DESCRIPTION OF THE DRAWINGS

FIG. 1 shows schematically a marine propulsion plant including a gas turbine and a reversing/reduction gear, FIG. 2 shows, on a larger scale, the design of a reversing/reduction gear, FIG. 3 shows a further embodiment of the reversing/reduction gear.

BRIEF DESCRIPTION OF THE PREFERRED EMBODIMENTS

The marine propulsion plant illustrated in FIG. 1 comprises a gas generating portion including a compressor 10, a combustion chamber 11 and a first turbine 12 driving the compressor. The combustion chamber is provided with a burner 13 having means 14 for governing the supply of fuel. A main, or propulsion turbine is denoted by 15. The output shaft 16 of the main turbine 15 is connected to the propeller shaft 17 by means of a reversible epicyclic gear 18, to be described in detail hereinbelow in connection with FIG. 2. A motor for starting the gas generating unit is denoted by 19.

Means for aiding in the braking of the main turbine 15 is indicated at 20 and may be of arbitrary known type.

Certain types of gas generator units cannot be completely shut down during reversing, but must continue to generate some amount of gas. In order to prevent motive fluid being supplied to the main turbine 15 during the braking step, a bleed-off valve 21 is provided, by means of which any desired amount of motive fluid may be made to by-pass the main turbine.

The main steps involved in a reversing operation are as follows: First of all, the supply of motive fluid to the turbine is cut off, and thereafter the driving connection at the reversing gear is disengaged. The movement of the ship through the water will continue, and the propeller will, acting as a water turbine, drive the propeller shaft and the part of the gear mechanically connected thereto in the same direction as before.

The inertia of the turbine and the part of the gear mechanically connected thereto will also make these parts continue to rotate in the same direction as before, but no, or only an insignificant amount of power is supplied thereto, so the speed will be rapidly reduced.

The brake 20 is then applied and the turbine rotor is brought to stand still, or almost so.

It will be possible gradually to engage the reversing gear. The propeller shaft system is still rotating in the original direction, and an engagement will bring the turbine part of the gear to rotate "backwards". This imposes a load on the propeller shaft, which reduces its tendency to rotate.

Thereafter motive fluid is supplied to the turbine, which now rotates contrary to its normal working direction. The action of the motive fluid upon the rotor buckets will first fully brake the now interconnected system from the turbine to the propeller, and finally bring this to rotate in the new direction of rotation.

For large outputs, the so called epicyclic gear has proven very useful, as it provides a high degree of reduction with comparatively small space requirements. Such a gear is schematically shown in FIG. 2.

A first sun wheel 40 is mounted upon the turbine output shaft 16 and a first rim wheel 41 is rotatably mounted thereon. This rim wheel carries a first set of planetary wheels 42, meshing with the sun wheel 40.

A second rim wheel 43 is rotatably mounted upon the propeller shaft 17 at the end of which a planetary carrier 44 is fitted. The second rim wheel 43 is provided with an external gear ring 45 serving as sun wheel for a second set of planetary gears 46 carried by the planetary carrier 44, as well as with an internal gear ring 47 cooperating with the first set of planetary gear wheels 42. A gear wheel 48, having an internal gear rim 49 for cooperation with the second set of planetary gear wheels 46, is carried by the first rim wheel 41 by means of the shafts of the first planetary gears 42.

Either of the two rim wheels may be kept stationary by means of locking devices 50 and 51, respectively. These may be of any well known type, but are here preferably also designed in such a manner that they may exert a braking effect upon the pertaining rim wheel. It is evident that when both locking devices are released, the turbine and the propeller shaft lack any torque transferring connection.

The function of the gear is as follows. Suppose first that rim wheel 41 is locked. The rotation of sun wheel 40 is then, by way of the first planetary gears 42, transferred to the second rim wheel 43 by way of its internal gear ring 47. The rotation of the second rim wheel is transferred to the propeller shaft 17 by way of the external gear ring 45 thereon, the second planetary gears 46 and the planetary carrier 44 with the internal gear wheel 48 being kept stationary by the first rim wheel 41.

If, instead the second rim wheel 43 is locked, the power is transferred from the first sun wheel 40 by way of the first planetary gears 42 to the internal gear wheel 48, internal gear ring 47 being stationary. The internal gear wheel 48 directly cooperates with the second set of planetary wheels 46, and as also the external gear ring 45 is stationary, the torque is transferred directly to the planetary carrier 44.

The reduction ratio is, in a conventional manner, determined by selection of the diameters of the various wheels. A way of further increasing the possibilities of selecting the exchange ratios is shown in FIG. 3, where gear wheel 48 and ring wheel 43 do not engage directly with the planetary gear wheels, but with pinions mounted upon the same shafts as said gear wheels.

In FIG. 3 the same reference numerals as in FIG. 2 are employed, whenever applicable.

A pinion 55 is fixedly mounted upon the shaft of each planetary gear wheel 42, and the internal gear rim of ring wheel 43 is adapted for cooperation with these pinions.

Further pinions 56 are fixedly mounted upon the shafts carrying the planetary gear wheels 46, and the internal gear rim 49 of gear wheel 48 is adapted for cooperation with these further pinions.

Otherwise this gear operates in the same manner as that of FIG. 2.

Reversing gears of above described types have noted advantages with respect to the requirements for space. With respect to the braking properties, it is, as above mentioned, of importance that the part of the gear connected to the turbine be as small as possible.

As the gear shall be able to transfer torque both ways, it is evident that sun wheel 40 could be mounted upon the propeller shaft, and the second planetary gear wheel carrier 44 be mounted upon the turbine output shaft, the position of the further components then being correspondingly shifted.

What I claim is:

1. A method for reversing the drive of a propulsion unit formed of a gas turbine prime mover capable of rotating in reverse, a driven member and a reversable epicyclic reduction gear train having drive connections with the turbine and with the driven member for transferring power between the prime mover and the driven member, the turbine being supplied with motor fluid and being connected through the gear train to the driven member in a manner whereby both the turbine and the driven member rotate in a forward direction, the method comprising effectively terminating the supply of motor fluid to the turbine, disconnecting the drive connection between the turbine and the reduction gear train, allowing the drive member and reduction gear train to rotate freely while braking the turbine and as small a part of the reversable gear as possible to at least approach a standstill condition, reversing the gear train and connecting the turbine thereto to cause the driven member, through the gear train, to rotate the turbine and said small part of the reversable gear in a reverse direction, then restoring the supply of motor fluid to the turbine thereby causing the turbine to brake fully and then to rotate in the forward direction through the gear train, causing the driven member to rotate in the reverse direction.

* * * * *

UNITED STATES PATENT AND TRADEMARK OFFICE
CERTIFICATE OF CORRECTION

PATENT NO. : 4,271,940

DATED : June 9, 1981

INVENTOR(S) : LARS T. COLLIN

It is certified that error appears in the above-identified patent and that said Letters Patent are hereby corrected as shown below:

[30] Priority Data
"7216003 SWEDEN" should be --16003/72 SWEDEN--

Signed and Sealed this

Fourth Day of August 1981

[SEAL]

Attest:

Attesting Officer

GERALD J. MOSSINGHOFF

Commissioner of Patents and Trademarks